(12) United States Patent
Deppermann et al.

(10) Patent No.: US 9,423,249 B2
(45) Date of Patent: Aug. 23, 2016

(54) BIOMETRIC MEASUREMENT SYSTEMS AND METHODS

(75) Inventors: Kevin Deppermann, St. Louis, MO (US); Susan Macisaac, St. Louis, MO (US); Haitao Xiang, St. Louis, MO (US); Travis Frey, St. Louis, MO (US)

(73) Assignee: Monsanto Technology LLC, St. Louis, MO (US)

( * ) Notice: Subject to any disclaimer, the term of this patent is extended or adjusted under 35 U.S.C. 154(b) by 1139 days.

(21) Appl. No.: 13/266,527

(22) PCT Filed: Apr. 27, 2010

(86) PCT No.: PCT/US2010/032548
§ 371 (c)(1),
(2), (4) Date: Dec. 15, 2011

(87) PCT Pub. No.: WO2010/126879
PCT Pub. Date: Nov. 4, 2010

(65) Prior Publication Data
US 2012/0113225 A1 May 10, 2012

Related U.S. Application Data

(60) Provisional application No. 61/214,848, filed on Apr. 29, 2009.

(51) Int. Cl.
*G06K 9/00* (2006.01)
*G01B 21/20* (2006.01)
*A01G 7/00* (2006.01)

(52) U.S. Cl.
CPC .................. *G01B 21/20* (2013.01); *A01G 7/00* (2013.01)

(58) Field of Classification Search
CPC .................................. A01G 7/00; G01B 21/20
USPC .......................................................... 382/110
See application file for complete search history.

(56) References Cited

U.S. PATENT DOCUMENTS

| 7,507,204 | B2* | 3/2009 | Shim et al. ................... 600/443 |
| 2010/0058492 | A1* | 3/2010 | Juarez ...................... A01H 1/00 800/265 |
| 2010/0066995 | A1* | 3/2010 | Rindle .......................... 356/5.03 |

FOREIGN PATENT DOCUMENTS

| EP | 1 000 540 | * | 5/2000 | ............. A01M 7/00 |
| EP | 1000540 | | 5/2011 | |
| WO | WO 86/00420 | * | 6/1985 | ............. G01V 9/04 |
| WO | 8600420 | | 1/1986 | |
| WO | 9602817 | | 2/1996 | |
| WO | 0131290 | | 5/2001 | |
| WO | WO 01/31290 | * | 5/2001 | ............. G01S 13/89 |
| WO | 2007016407 | | 2/2007 | |

* cited by examiner

*Primary Examiner* — Amara Abdi
(74) *Attorney, Agent, or Firm* — Polster Lieder

(57) ABSTRACT

In various embodiments, the present disclosure provides a method of generating crop biometric information in field conditions that includes scanning top surfaces of various plant crown structures of a plurality of plants in one or more rows of plants within a field to collect scan data of the crown structures. Additionally, the method includes converting the scan data into a high spatial resolution 3-dimensional field contour map that illustrates an aggregate 3-dimensional field contour of the scanned plants. The method further includes extracting, from the high spatial resolution 3-dimensional field contour map, biometric information relating to the plants in each of one or more selected rows of the scanned rows of plants.

27 Claims, 12 Drawing Sheets

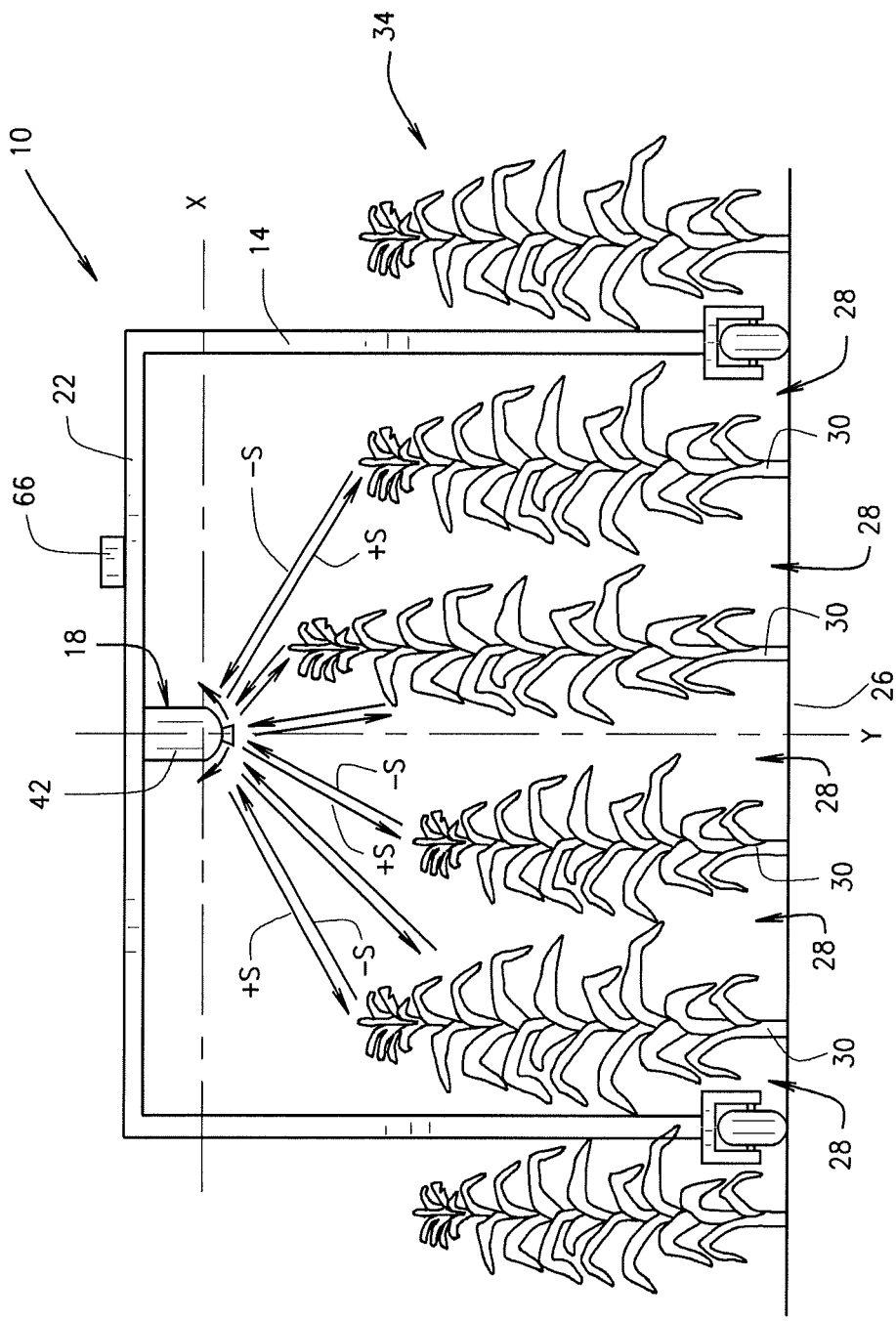

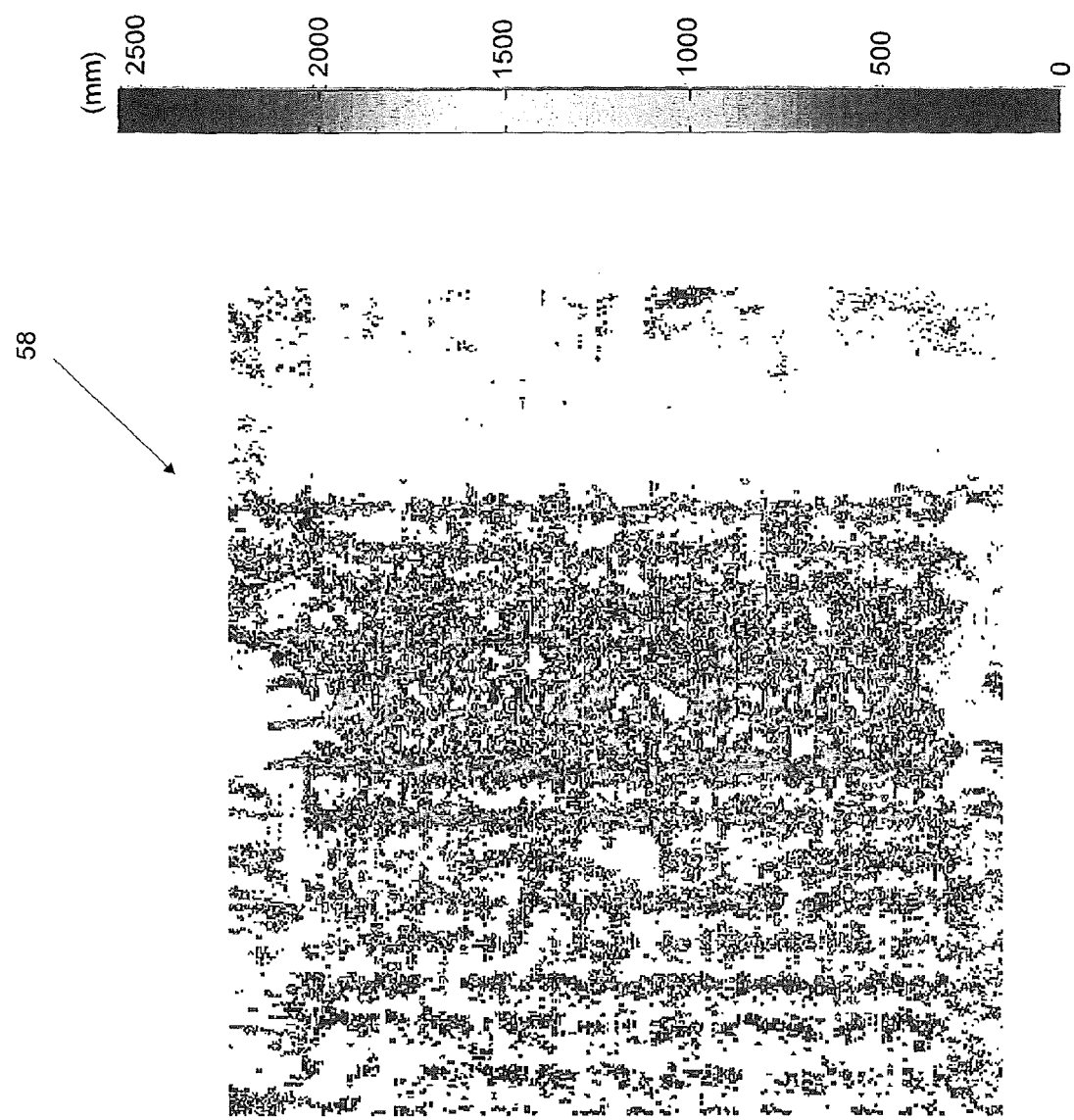

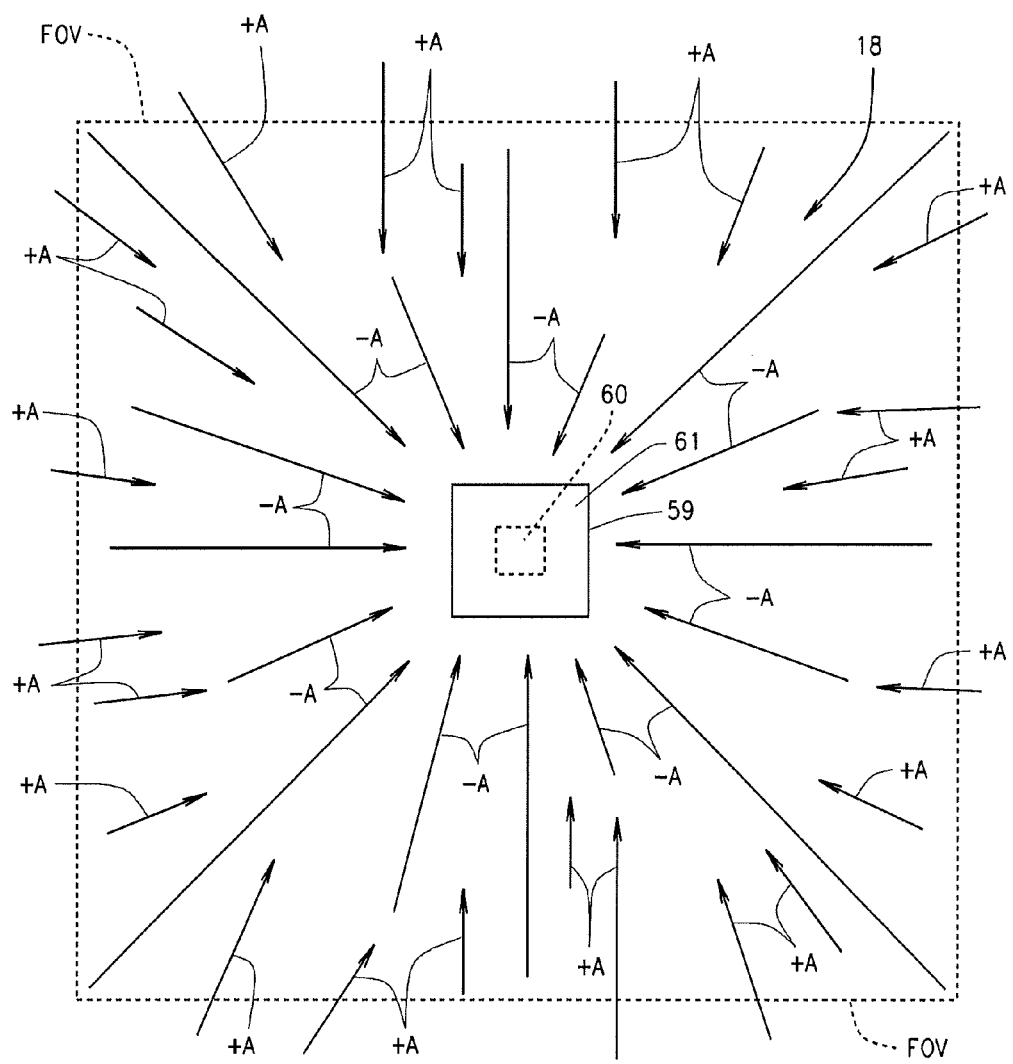
F I G . 7A

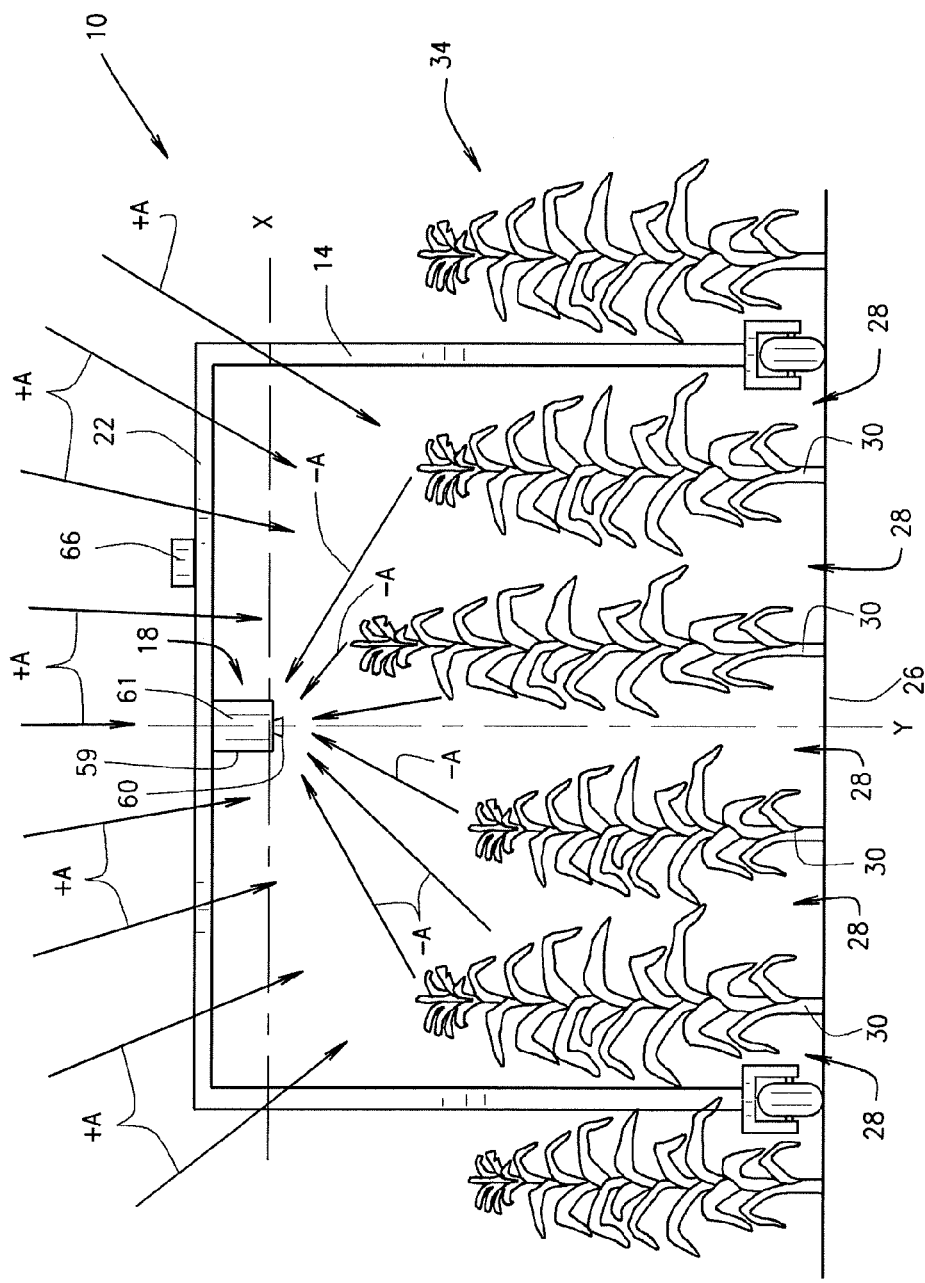

BIOMETRIC MEASUREMENT SYSTEMS AND METHODS

CROSS-REFERENCE TO RELATED APPLICATIONS

This application is a National Stage of International Application No. PCT/US2010/032548, filed Apr. 27, 2010, which claims priority to U.S. Provisional Application No. 61/214,848, filed on Apr. 29, 2009, the disclosures of which are incorporated herein by reference in their entirety.

FIELD

The present teachings relate to plant biometric measurement systems and methods.

BACKGROUND

The statements in this section merely provide background information related to the present disclosure and may not constitute prior art.

In today's agricultural industry constant efforts are being made to improve crop breeding methods and techniques. In various instances, to obtain crop analytic data used in such crop breeding methods and techniques, test plots of various plant genotypes are grown and the plants within the plots are measured and monitored to obtain biometric data, such as plant height, crop density and plant canopy volume. Subsequently, the biometric data can be analyzed to select different genotypes that exhibit desired traits, e.g., higher yield and/or higher crop density, to help improve crop breeding lines.

For example, plant height can be utilized to calibrate against yields. In such instances, the height of plants within a test plot and the corresponding yield of the respective plants can be measured and monitored then analyzed to calculate a height-to-yield correlation that can be used to select certain plant genotypes for breeding.

To acquire such biometric data, some known plant measurement methods involve physically measuring the plant height, density, yield, etc., of the plants within a test plot by hand. However, data collected by hand is susceptible to human error and is typically very time consuming. Alternatively, attempts have been made to utilize passive optical sensing techniques, sometimes used for acquiring plant agronomic and biophysical data, but these techniques have difficulty obtaining crop biometrics information, e.g., plant height, canopy volume and crop density. The primary reason for this is that crop biometric data, e.g., plant height data, canopy volume and crop density, is tied to the vertical or height characteristics of the plants that passive optical sensing techniques are not capable of measuring. Additionally, known passive optical sensing techniques only provide 2-dimensional images of each plant.

SUMMARY

The present disclosure provides systems and methods for generating crop biometric information in field conditions using a terrestrial mobile data collection system.

In various embodiments, the method includes scanning top surfaces of various plant crown structures of a plurality of plants in one or more rows of plants within a field to collect scan data of the crown structures. Additionally, the method includes converting the scan data into a high spatial resolution 3-dimensional field contour map that illustrates an aggregate 3-dimensional field contour of the scanned plants. The method further includes extracting, from the high spatial resolution 3-dimensional field contour map, biometric information relating to the plants in each of one or more selected rows of the scanned rows of plants.

In various other embodiments, the method includes positioning a data collection device at a height that is greater than a height of all plants within a field of plants, moving the data collection device along the rows of plants in the field, scanning top surfaces of various plant crown structures of the plants in one or more of the rows to collect scan data, converting the scan data into a high spatial resolution 3-dimensional field contour map illustrating an aggregate 3-dimensional field contour of the scanned plants and the ground surface. The method additionally includes extracting, from the high spatial resolution 3-dimensional field contour map, biometric information relating to the plants in each of one or more selected rows of the scanned rows of plants.

In various still other embodiments, the method includes positioning a data collection device of the terrestrial mobile data collection system at a height that is greater than a height of all plants within a field of plants comprising a plurality of rows of plants, and moving the data collection device along the rows of plants in the field, via a mobile platform of the terrestrial mobile data collection system, with the data collection device remaining above the plants. Additionally, the method includes scanning top surfaces of various plant crown structures of the plants in one or more of the rows and a surface of the ground from which the respective plants are growing, via the data collection device, to collect scan data as the data collection device is moved along the rows of plants, the crown structures of each plant comprising a canopy of each respective plant, and converting the scan data into a high spatial resolution 3-dimensional field contour map that illustrates an aggregate 3-dimensional field contour of the scanned plants and the ground surface, via a processing device of the terrestrial mobile data collection system. The method further includes extracting crop canopy contour data from the 3-dimensional field contour map of the scanned plants and the ground surface, and extracting, from the crop canopy contour data, biometric information relating to the plants in each of one or more selected rows of the scanned rows of plants.

In yet other embodiments the system includes a data collection device positioned, via an overhead beam of the system, at a height that is greater than a height of all plants within a field of plants comprising a plurality of rows of plants. The system additionally includes a mobile platform structured and operable to move the data collection device along the rows of plants in the field with the data collection device remaining above the plants, the data collection device structured and operable to scan top surfaces of various plant crown structures of the plants in one or more of the rows to collect scan data, the crown structures of each plant comprising a canopy of each respective plant. Furthermore, the system includes a processing device that is structured and operable to convert the scan data into a high spatial resolution 3-dimensional field contour map that illustrates an aggregate 3-dimensional field contour of the scanned plants and the ground surface. The processing device that is further structured and operable to extract crop canopy contour data from the 3-dimensional field contour map, and utilize the extracted crop canopy contour data to generate biometric information relating to the plants in each of one or more selected rows of the scanned rows of plants.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIG. 2B is a front view of the terrestrial mobile data collection system exemplarily shown in FIGS. 1A and 1B, including the emitter/receiver head shown in FIG. 2A, in accordance with various embodiments of the present disclosure.

FIG. 4 is an exemplary illustration of a high spatial resolution 3-dimensional field contour map of the scanned plants and the ground surface generated from a plurality of 2-dimensional data slices such as that shown in FIG. 3, in accordance with various embodiments of the present disclosure.

Figure 7C:
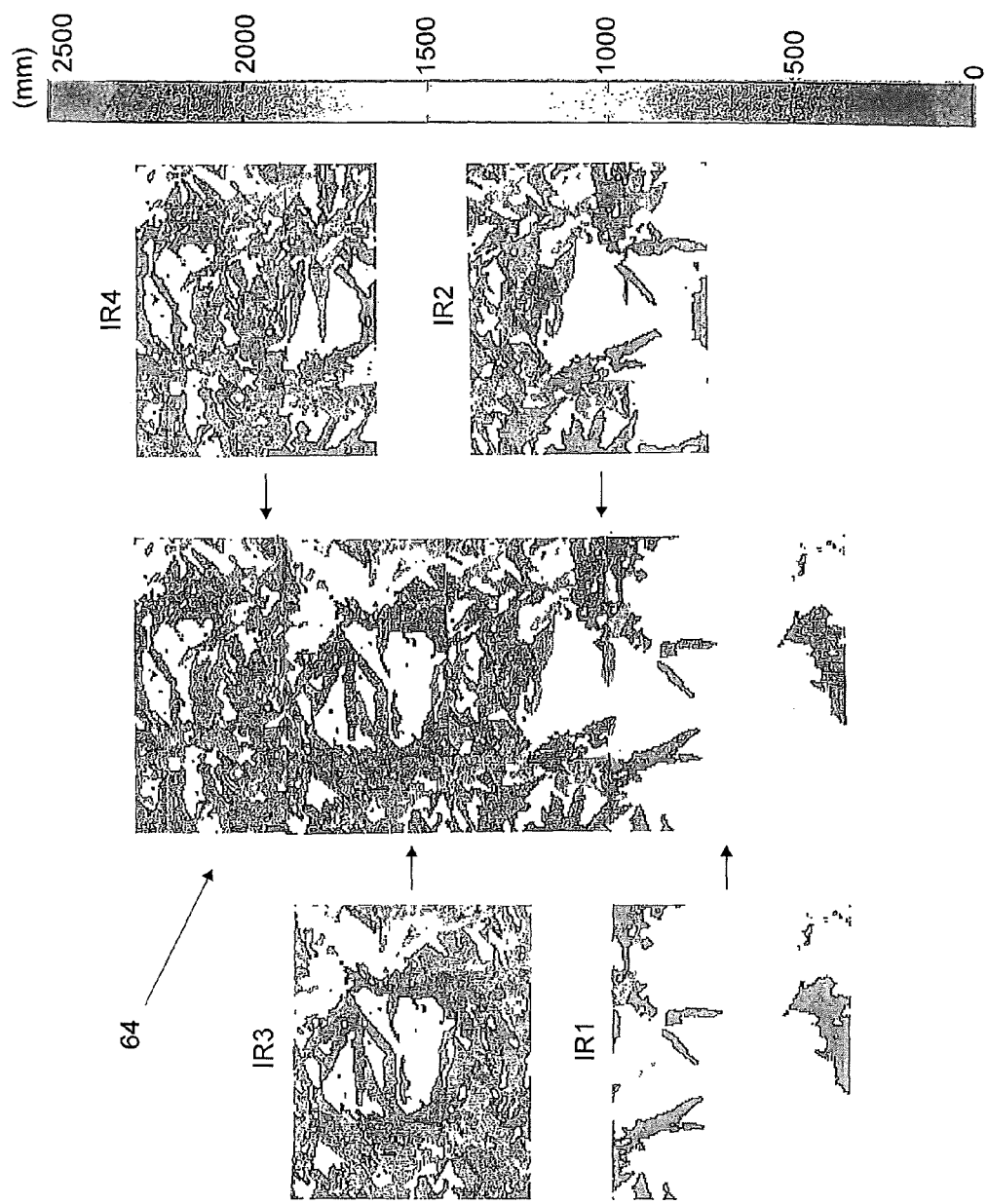
FIG. 7A is a block diagram of a 3-dimensional digital camera of the terrestrial mobile data collection system, exemplarily shown in FIGS. 1A and 1B, in accordance with various embodiments of the present disclosure.
FIG. 7B is a front view of the terrestrial mobile data collection system exemplarily shown in FIGS. 1A and 1B, including the 3-dimensional digital camera shown in FIG. 7A, in accordance with various embodiments of the present disclosure.

FIG. 7C is an exemplary illustration of a plurality of 3-dimensional images generated from sets of reflected light signals captured via the 3-dimensional digital camera shown in FIGS. 7A and 7B, and a high spatial resolution 3-dimensional field contour map generated from the 3-dimensional images, in accordance with various embodiments of the present disclosure.

Figure 1A:
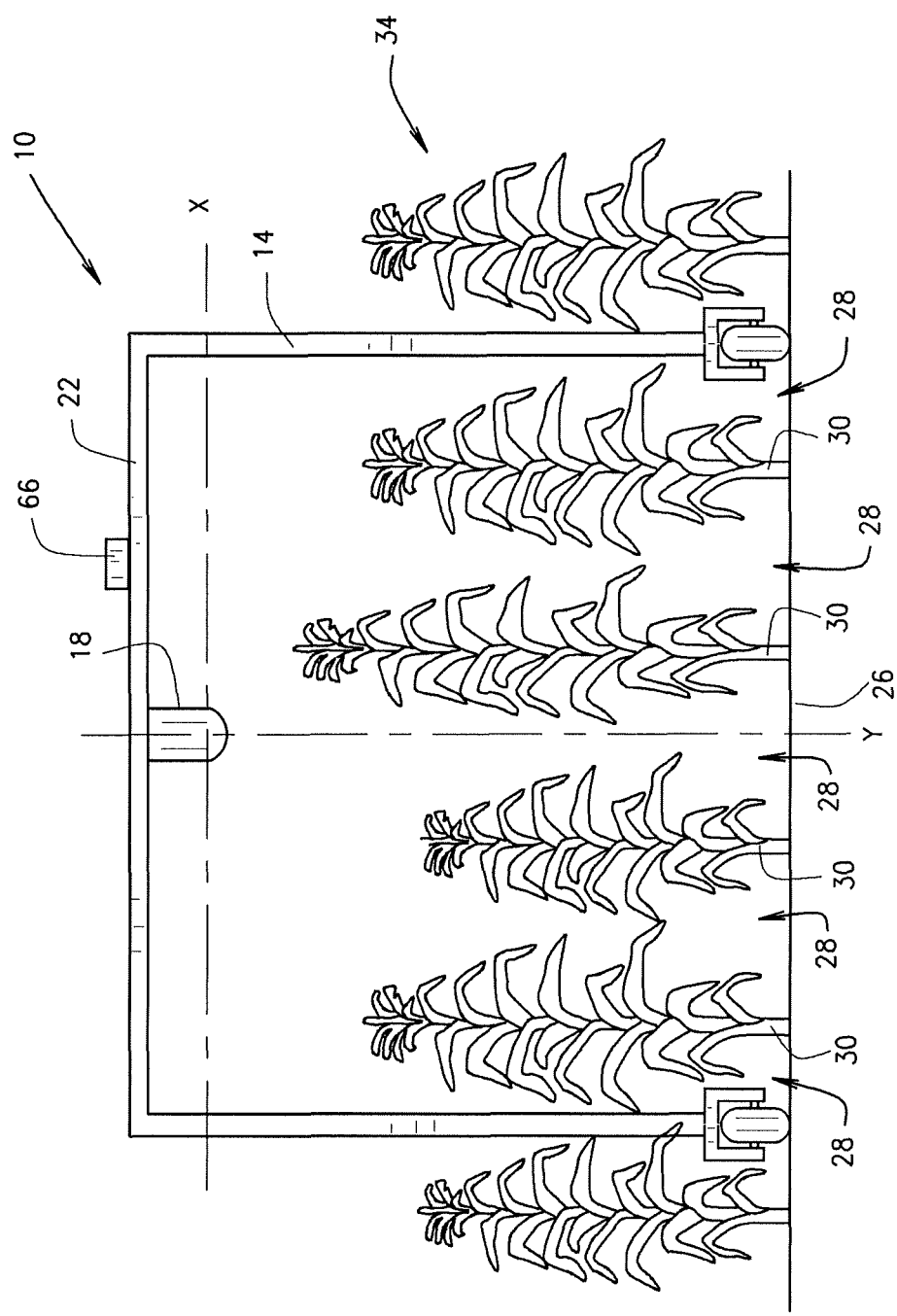
FIG. 1A is a front view of a terrestrial mobile data collection system, in accordance with various embodiments of the present disclosure.
Figure 1B:
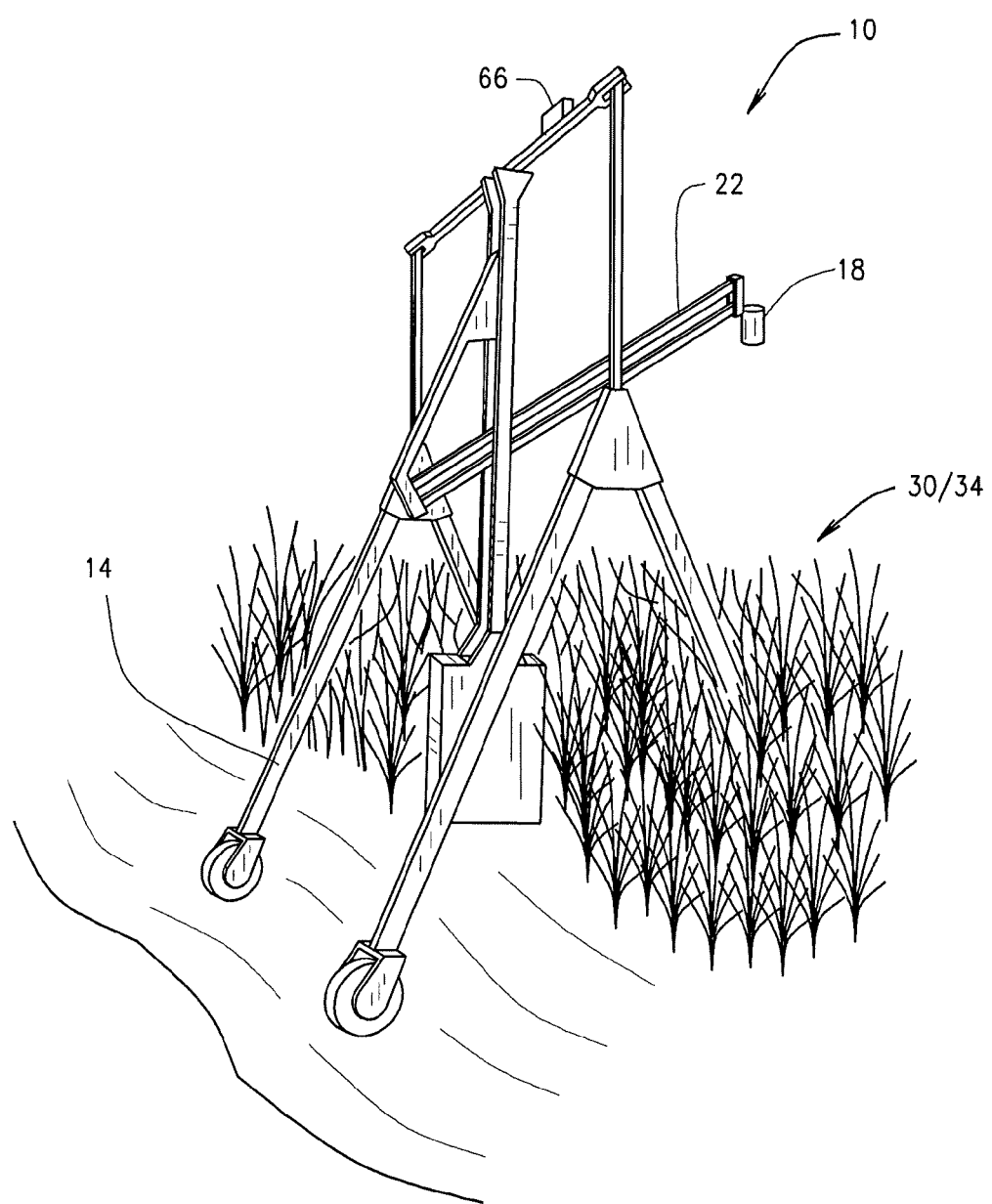
FIG. 1B is an isometric view of a terrestrial mobile data collection system, such as that shown in FIG. 1A, in accordance with various embodiments of the present disclosure.
Figure 8:
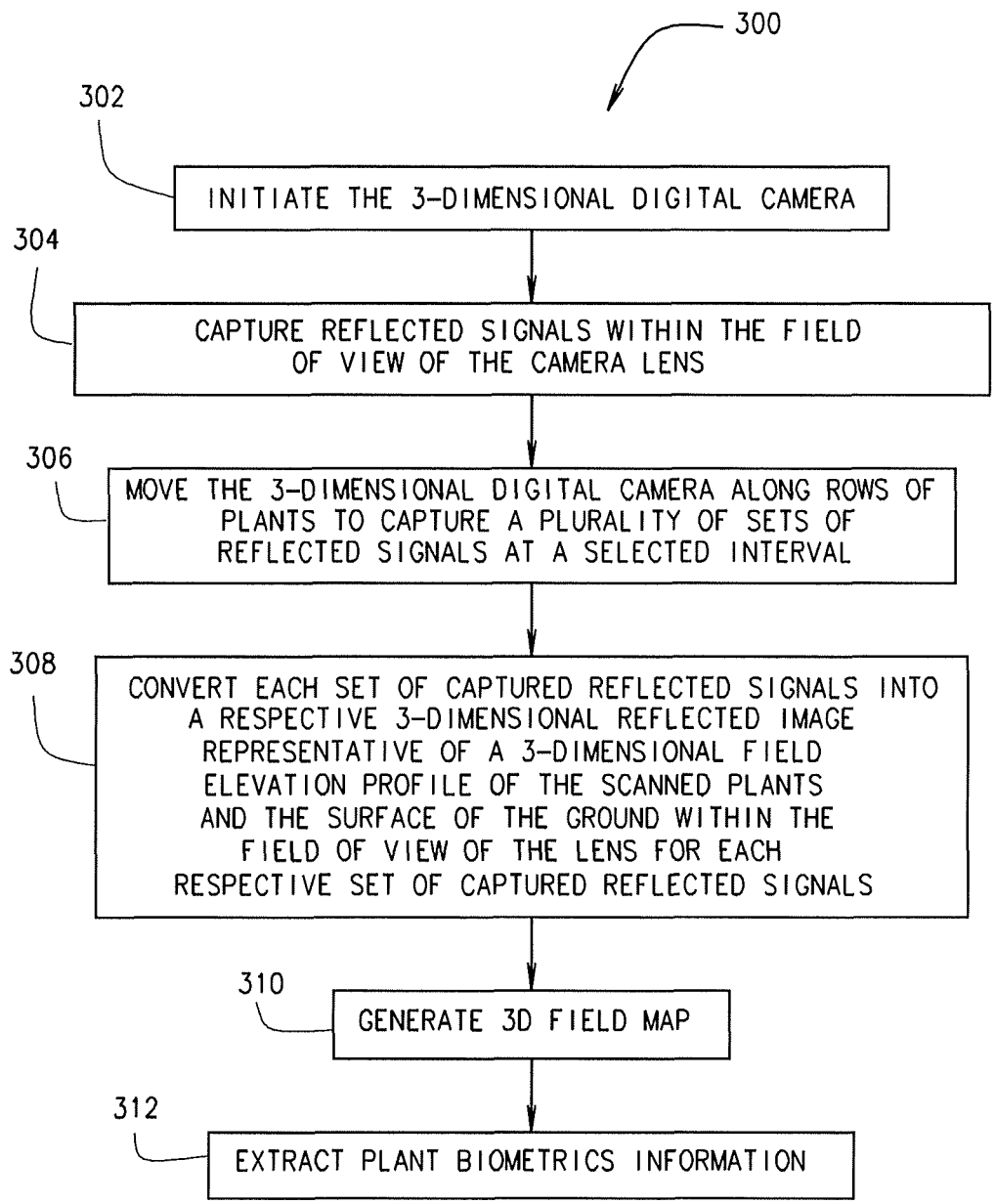

FIG. 8 is a flow chart illustrating a method of generating the crop biometric information in field conditions using the terrestrial mobile data collection system, exemplarily shown in FIGS. 1A and 1B, including the emitter/receiver head shown in FIGS. 7A and 7B, in accordance with various embodiments of the present disclosure.

Figure 9:
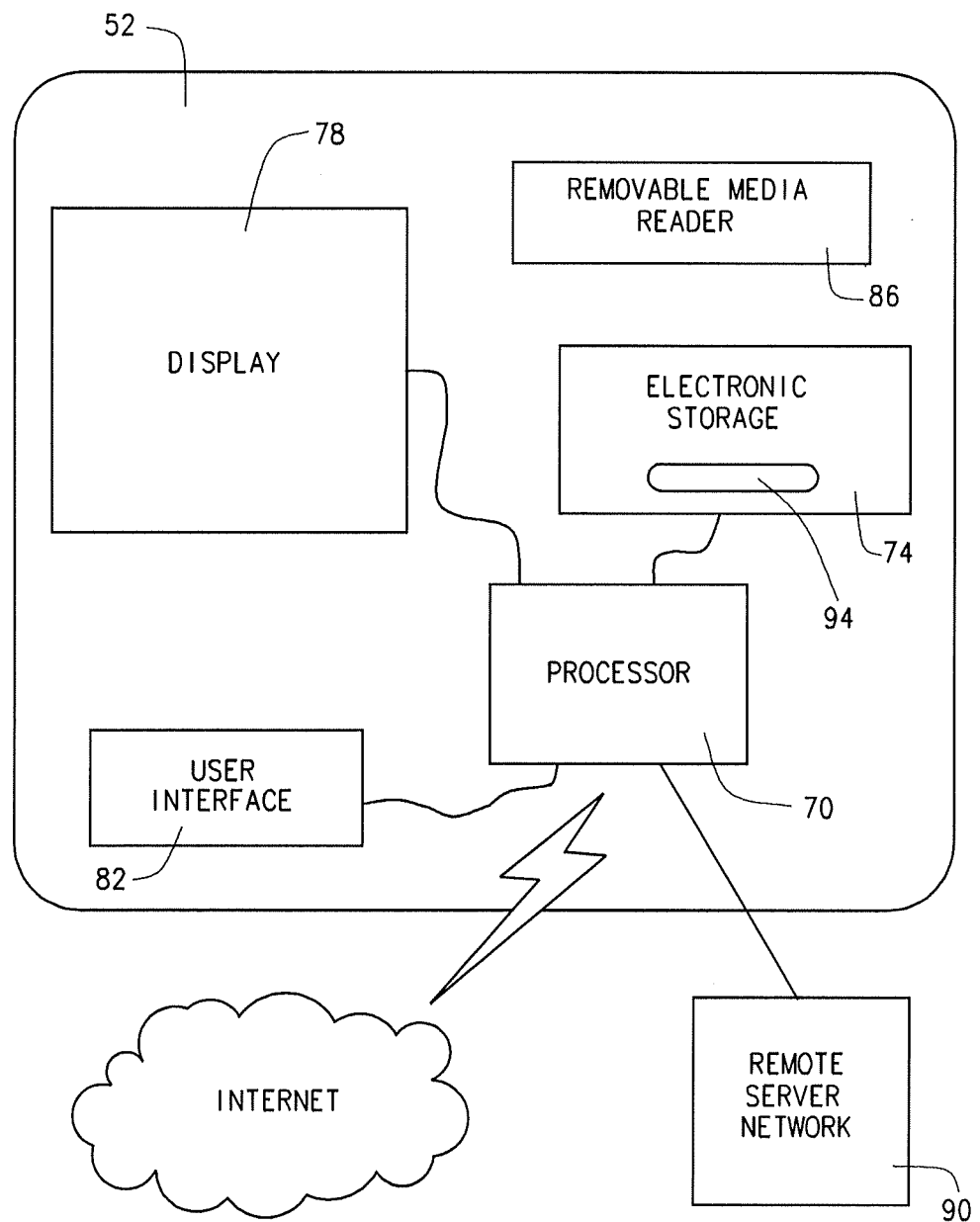

FIG. 9 is a block diagram of a processing device of the terrestrial mobile data collection system shown in FIGS. 1A and 1B, in accordance with various embodiments of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements.

The present disclosure provides systems and methods for acquiring various structural characteristic data of a plurality of plants in a field and generating biometric information from the acquired data. FIGS. 1A and 1B illustrate a terrestrial mobile data collection system (TMDCS) 10, in accordance with various embodiments of the present disclosure. The TMDCS 10 includes a terrestrial mobile platform 14 and a plant structural characteristic data collection device 18 mounted to an overhead beam, or arm, 22 of the mobile platform 14.

The mobile platform 14 can be any mobile structure, apparatus, device or vehicle suitable for moving along the ground 26 longitudinally within plant corridors 28 formed between rows of a plurality of plants 30 in a field 34. For example, in various embodiments, the mobile platform 14 can be a structure, apparatus, device or vehicle mounted on wheels such that the mobile platform 14 can be pushed and/or pulled longitudinally along the plant corridors 28. Alternatively, in various other embodiments, the mobile platform 14 can be a motorized structure, apparatus, device or vehicle that is structured and operable to be self-propelled such that the mobile platform 14 can be automatically controlled to move along the plant corridors 28 via remote or onboard control of a motor or engine (not shown) operable to provide motive force to the mobile platform 14.

The overhead beam, or arm, 22 is disposed above the rows of plants 30 and the plant structural characteristic data collection device 18 is mounted to the overhead beam 22 such that the data collection device 18 is positioned at a height that is greater than the height of all the plants 30 in the field 34. Accordingly, as the mobile platform 14 moves along the plant corridors 28 the data collection device 18 is simultaneously moved along and above the rows of plants 30.

The plant structural characteristic data collection device 18 can be any data collection device structured and operable to acquire data relating to one or more structural characteristics of a plurality of the plants 30 in the field 34. For example, in various embodiments, the plant structural characteristic data collection device 18 can be a laser based data collection device structured and operable to emit laser signals of any suitable desired wavelength and receive those signals after the signals have reflected off of top surfaces of various plant crown structures and the ground 26. Or, in various other embodiments, the plant structural characteristic data collection device 18 can comprise a 3-dimensional digital camera structured and operable to receive optical light signals that have reflected off of top surfaces of the various plant crown structures and the ground 26. Alternatively, in yet other embodiments, the plant structural characteristic data collection device 18 can be an electromagnetic based data collection device structured and operable to emit electromagnetic signals and receive those signals after the signals have reflected off of top surfaces of various plant crown structures and the ground 26. Or, in yet other embodiments, the plant structural characteristic data collection device 18 can be a sound based data collection device structured and operable to emit sonic signals and receive those signals after the signals have reflected off of top surfaces of various plant crown structures and the ground 26.

As used herein, the term plant crown is defined as the totality of the aboveground parts of each respective plant 30, and the plant crown structures, as used herein, include the stems, leaves and reproductive structures of the respective plant crown. Additionally, the term plant canopy is defined as the totality of the plant crowns of all the plants 30 growing in a given row of plants 30. Furthermore, the term row of plants 30 is defined as all the plants 30 growing from a common furrow, wherein the space between the rows of plants 30, i.e., the space between the furrows, forms the plant corridors 28 through which the TMDCS 10 moves, as described herein. In various embodiments, each row of plants 30 in the field comprises plants of the same selected genotype, and the plants 30 in at least one of the rows are of a different genotype than the plants 30 in at least one other row of plants 30 in the field.

Figure 2A:
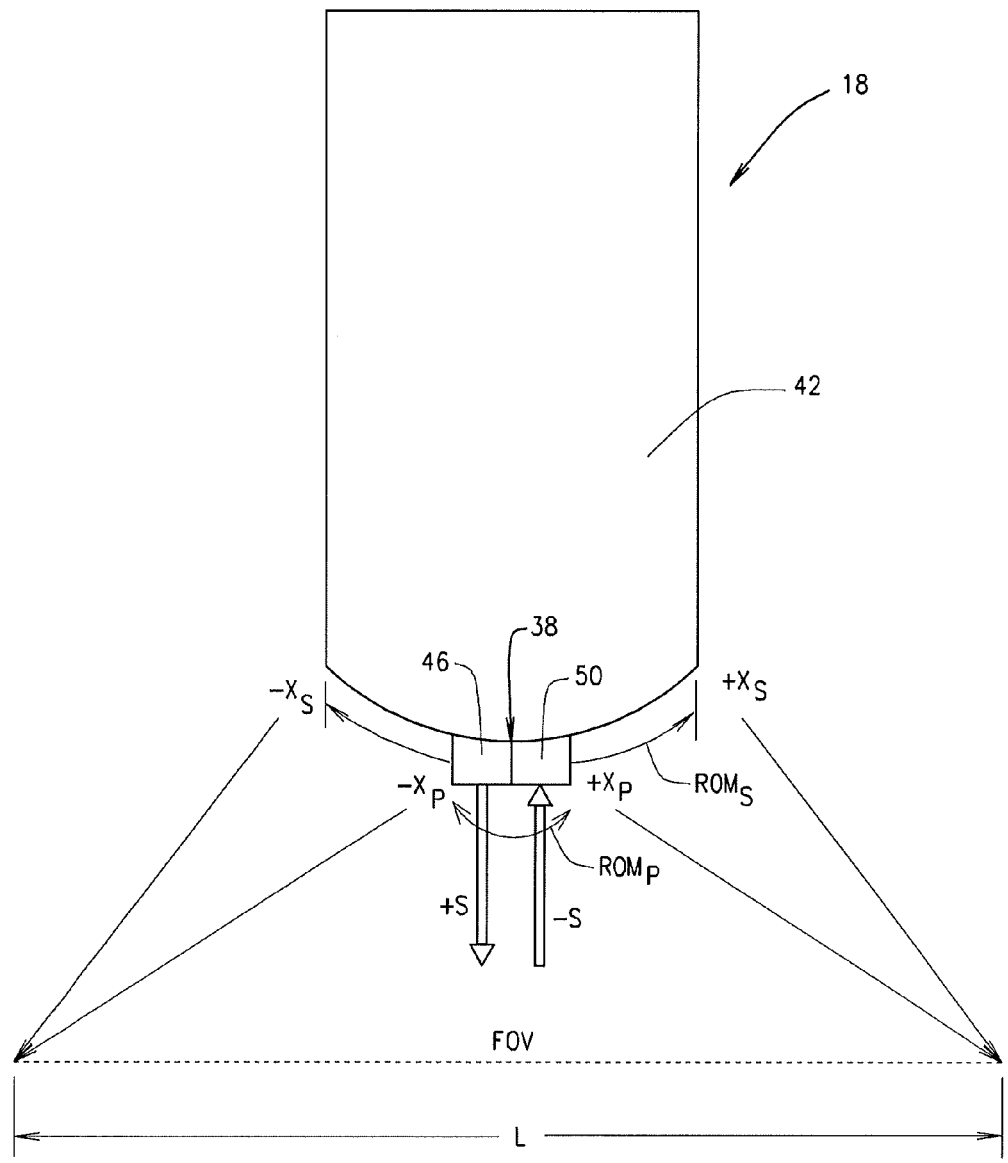
FIG. 2A is a block diagram of an emitter/receiver head of the terrestrial mobile data collection system, exemplarily shown in FIGS. 1A and 1B, in accordance with various embodiments of the present disclosure.

Referring now to FIGS. 2 and 2A, in various embodiments, the plant structural characteristic data collection device 18 includes an emitter/receiver head 38 movably mounted to an electronic component housing body 42. The emitter/receiver head 38 includes an emitter 46 and a receiver 50, and is slidingly, or pivotally, mounted to a distal end of the housing body 42 such that the emitter/receiver head 38 can slidingly, or pivotally, oscillate at a very rapid speed along a predefined linear range of motion ROM. For example, in various implementations, the emitter/receiver head 38 can slidingly oscillate back and forth along a linear range of motion ROM, shown as $ROM_S$ in FIG. 2A, between a first endpoint −X and a second endpoint +X, shown as $-X_S$ and $+X_S$ in FIG. 2A, such that emitted data collection signals +S are emitted from the emitter 46 within a field of view FOV of the emitter/receiver head 38. Or, in various implementations, the emitter/receiver head 38 can pivotally oscillate back and forth along a linear range of motion ROM, shown as $ROM_P$ in FIG. 2A, between the first and second endpoints −X and +X, shown as $-X_P$ and $+X_P$ in FIG. 2A, such that emitted data collection signals +S are emitted from the emitter 46 with in the field of view FOV of the emitter/receiver head 38.

In various embodiments, the data collection device 18 is mounted to the overhead beam 22 such that the linear range of motion ROM, e.g., $ROM_S$ or $ROM_P$, is substantially orthogonal to the rows of plants 30 as the data collection device 18 is moved along the rows of plants 30. Additionally, each oscillation of the emitter/receiver head 38 includes a forward sweep of the emitter/receiver head along the linear range of motion from −X to +X, e.g., from $-X_S$ to $+X_S$ or from $-X_P$ to $+X_P$, and a backward sweep of the emitter/receiver head along the linear range of motion from +X to −X, e.g., from $+X_S$ to $-X_S$ or from $+X_P$ to $-X_P$. Moreover, the data collection device 18 can be structured and operable to oscillate the emitter/receiver head 38 through any desired range of motion ROM between −X and +X to achieve a field of view FOV of any desired length L such that any desired number of rows of plants 30 can be scanned, i.e., within the field of view FOV, during each forward and backward sweep. Furthermore, the data collection device 18 is structured and operable to oscillate the emitter/receiver head between −X and +X at a very rapid speed. For example, in various embodiments, the data collection device 18 is structured and operable to oscillate the emitter/receiver head between −X and +X approximately seventy-five times per second.

The data collection device 18 is structured and operable to substantially continuously emit the data collection signals +S, e.g., laser signals, electromagnetic signals or sonic signals, from the emitter 46 as the emitter/receiver head 38 oscillates back and forth along the range of motion ROM. In the various embodiments, wherein the emitter/receiver head 38 emits laser signals, the data collection system 18 can comprise a LIDAR (Light Detection and Ranging) system and the emitter/receiver head 38 can include one or more light filters (not shown) that filter out light of selected wavelengths such that the laser signals emitted are of a particular desired wavelength. The emitted data collection signals +S are directed downward toward the plants 30 and the ground 26 along the field of view FOV. The emitted data collection signals +S are then reflected from the top surfaces of the various plant crown structures or the ground 26, and return back to the receiver 50 as reflected data collection signals −S, where they are received by the receiver 50. A computer based processing device 52 derives scan data (described below) from the received reflected signals −S. More particularly, the processing device 52 derives and collects the scan data for each respective forward and backward sweep as the TMDCS 10 moves along the corridors 28 in the field 34.

Generally, the processing device 52 performs the various data processing functions, the crop biometric and/or 3-dimensional mapping program/algorithm execution, and all other computing functions described herein. It is envisioned that the processing device 52 can be the data collection device 18, a separate computing device communicatively connected to the data collection device 18, or a combination thereof. The separate computing device can be any suitable computer based device, system or network that is mounted locally on the mobile platform 14 or located remotely from the mobile platform 14.

Figure 3:
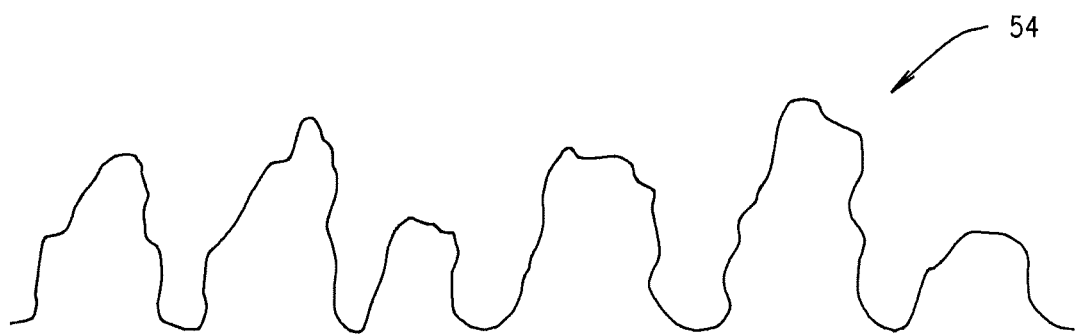
FIG. 3 is an exemplary illustration of a 2-dimensional data slice representative of a 2-dimensional field elevation profile of scanned plants and a surface of the ground for one of a forward or backward data collection sweep performed by the emitter/receiver head shown in FIG. 2, in accordance with various embodiments of the present disclosure.

Referring now to FIGS. 2A, 2B, 3 and 4, as described further below, upon collection of the scan data for each forward and backward sweep, the processing device 52 converts the scan data for each respective sweep into a respective 2-dimensional data slice 54 (shown in FIG. 3). Each slice 54 is representative of a respective 2-dimensional field elevation profile of the scanned plants 30 and the surface of the ground 26 for each respective forward or backward sweep. The processing device 52 then compiles, or combines, all of the 2-dimensional data slices 54, to generate a high spatial resolution 3-dimensional field contour map 58 (shown in FIG. 5) that is illustrative of an aggregate 3-dimensional top-view contour of the scanned plants 30 and the ground surface that can be displayed on a display device (e.g., display 78 described below) of the processing device 52. From the high spatial resolution 3-dimensional field contour map 58, the processing device 52 can then extract biometric information relating to the plants 30 in each of one or more selected rows of the scanned rows of plants 30, e.g., plant height data, plant density data, canopy volume data, plant growth rate data, etc.

In the various embodiments, wherein each row of plants 30 comprises plants of the same selected genotype, and the plants 30 in at least one of the rows are of a different genotype than the plants 30 in at least one other row of plants 30 in the field, the extracted biometric information can be utilized to determine which genotype of plants have one or more particular desired traits.

Figure 5:
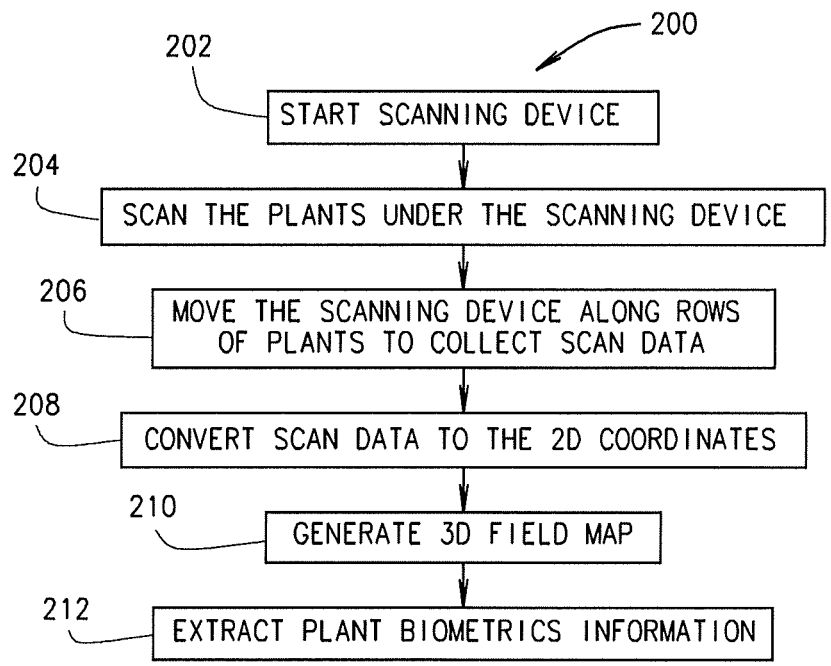
FIG. 5 is a flow chart illustrating a method of generating the crop biometric information in field conditions using the terrestrial mobile data collection system, exemplarily shown in FIGS. 1A and 1B, including the emitter/receiver head shown in FIGS. 2A and 2B, in accordance with various embodiments of the present disclosure.

FIG. 5 provides a flow chart 200 illustrating a method of generating the crop biometric information in field conditions using the TMDCS 10, in accordance with various embodiments of the present disclosure. Initially, the plant structural characteristic data collection device 18 is activated to begin emission and reception of the emitted and received data collection signals +S and −S, and begin the oscillation of the emitter/receiver head 38, as described above and indicated at 202. Next the plant structural characteristic data collection device 18 scans the top surfaces of crown structures of the plants 30 within the field of view FOV of the emitter/receiver head 38 during each forward and backward sweep as the mobile platform 14 moves through the corridors 28 and longitudinally along the rows of plants 30 to collect the scan data, as indicated at 204 and 206.

More particularly, the emitter/receiver head 38 oscillates along the linear range of motion ROM, e.g., $ROM_S$ or $ROM_P$, that is substantially orthogonal to the rows of plants 30 as the data collection device 18 is moved along the rows of plants 30, via movement of the mobile platform 14. The data collection signals +S are continuously emitted from the emitter 46 as the emitter/receiver head 38 oscillates back and forth. Subsequently, the emitted data collection signals +S are reflected off of the top surfaces of the various plant crown structures or the ground 26 within the field of view FOV during each respective forward and backward sweep of the emitter/receiver head 38. The reflected data collection signals −S are then received by the receiver 50 during each respective forward and backward sweep of the emitter/receiver head 38. As described above, the scan data for each forward sweep and each backward sweep is derived from the respective received reflected data collection signals −S. In various embodiments, the scan data comprises travel time data for each of the data collection signals +S/−S emitted and received by data collection device 18. That is, the processing device 52 calculates the time it takes each signal +S emitted during each respective forward and backward sweep to travel from the emitter 46, to the top surface of the various plant crown structures or the ground 26, and then be returned back to the receiver 50 as reflected signal −S. In such embodiments, this travel time comprises the scan data.

After the scan data, i.e., the signal travel time data, is calculated for each signal +S/−S emitted and received during each respective forward and backward sweep, the processing device 52 converts the scan data into 2-dimensional coordinates, e.g., 2-dimensional Cartesian coordinates, as indicated at 208. In various embodiments, to convert the scan data into 2-dimensional coordinates, the processing device 52 converts the travel time of each data collection signal +S/−S emitted and received during each forward and backward sweep into travel distance data. The travel distance data is representative of a distance from the data collection device 18 each respective data collection signal +S traveled before being reflected from the various plant crown structures or the top surface of the ground. The processing device 52 then converts the travel distance data of each data collection signal +S/−S emitted and received during each respective forward and backward sweep into a set of 2-dimensional coordinates located within a respective sweep plane generated by the data collection signals emitted during the respective forward or backward sweep.

That is, each forward sweep defines a sweep plane within which each of the sets of 2-dimensional coordinates generated for each of the signals +S/−S emitted and received during the respective forward sweep resides. Similarly, each backward sweep defines a sweep plane within which each of the sets of 2-dimensional coordinates generated for each of the signals +S/−S emitted and received during the respective backward sweep resides. Moreover, all of the sets of 2-dimensional coordinates within each respective sweep plane comprise a corresponding one of the plurality of 2-dimensional data slices 54, wherein each of the 2-dimensional data slices 54 provides a respective 2-dimensional field elevation profile, as described above.

Utilizing the plurality of 2-dimensional data slices 54, the processing device 52 generates the 3-dimensional field contour map 58 illustrating the aggregate 3-dimensional top-view contour of the scanned plants 30 in the field 34, as indicated at 210. More particularly, the processing device 52 aggregates, or combines, all the 2-dimensional field elevation profiles of the plurality of 2-dimensional data slices to generate the aggregate 3-dimensional field contour map 58. In various embodiments, the scan data is collected and converted into the 2-dimensional data slices 54 that are representative of respective 2-dimensional field elevation profiles, and the 2-dimensional data slices 54 are converted into the 3-dimensional field contour map 58 illustrative of the aggregate 3-dimensional top-view field contour, in real time. That is, the scan data is collected and the 2-dimensional data slices 54 and 3-dimensional field contour map 58 are generated substantially contemporaneously with the receipt of the reflected signals −S by the data collection device 18 as the TMDCS 10 travels through the field 34. Once the TMDCS 10 has traversed the entire field 34, and the 3-dimensional field contour map 58 has been generated for the entire field 34, the processing device 52 can extract plant biometric information and/or data from the 3-dimensional field contour map 58, as indicated at 212.

Figure 6:
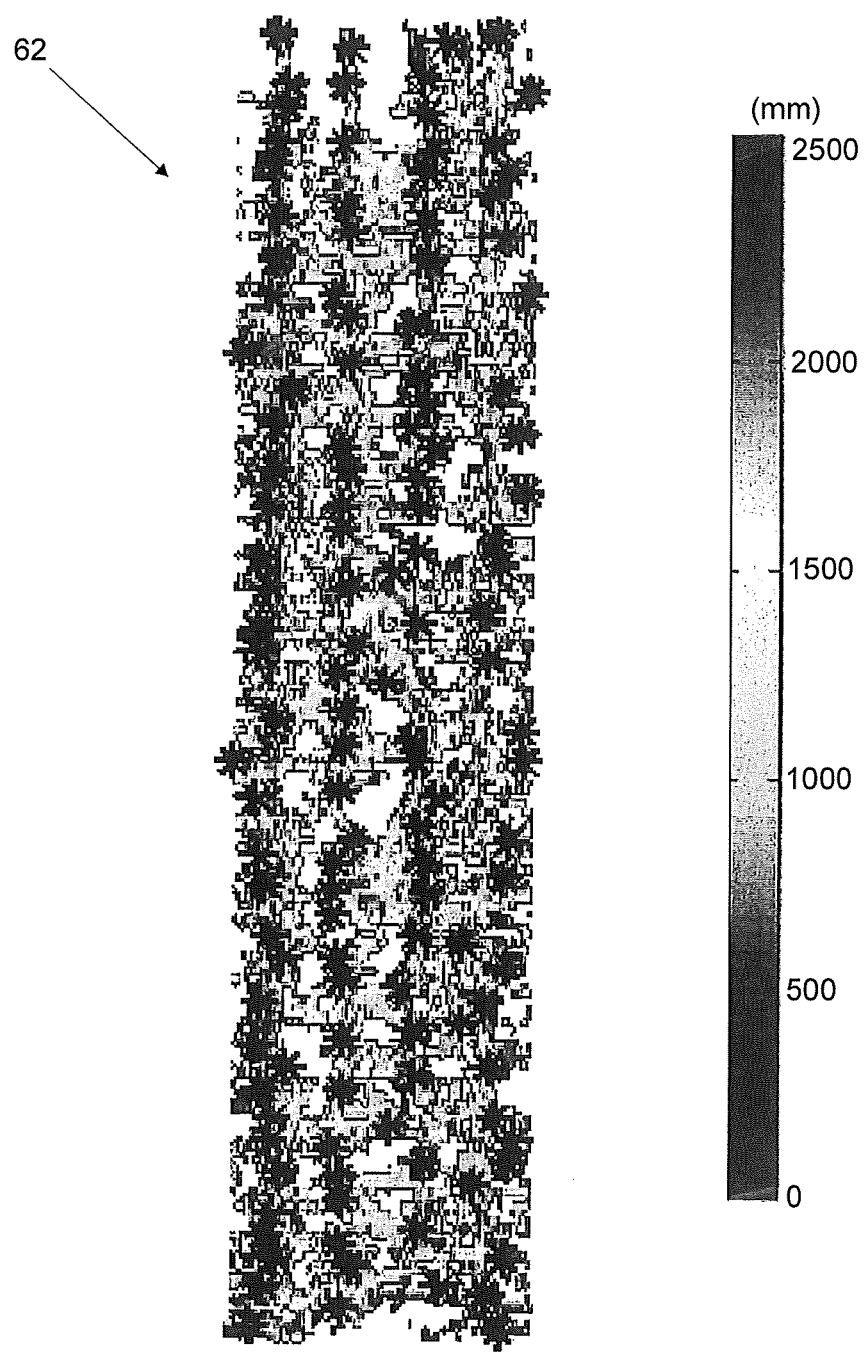
FIG. 6 is an exemplary illustration of 3-dimensional crop canopy contour data for selected rows of scanned plants, derived from the 3-dimensional field contour map shown in FIGS. 4 and 7C, in accordance with various embodiments of the present disclosure.

Referring now to FIG. 6, in various embodiments, to extract the biometric information and/or data, the processing device 52 extracts from the 3-dimensional field contour map 58 a 3-dimensional crop canopy contour data map 62. The 3-dimensional crop canopy contour data map 62 is illustrative of the 3-dimensional top-view contour of only the plants 30 in the field 34, absent the background of the ground surface 26, particularly, the 3-dimensional top-view contour of one or more selected rows of plants 30, absent the background of the ground surface 26. Utilizing the extracted 3-dimensional crop canopy contour map 62, the processing device 52 can calculate various biometric data relating to the individual plants 30, the individual rows of plants 30 or the crop of plants consisting of the selected rows. For example, utilizing the extracted 3-dimensional crop canopy contour map 62, the processing device 52 can identify the location of each plant 30 in one or more selected rows within the scanned field 34 and determine various spatial dimensions of the crown for each respective plant 30 and the crop canopy of the selected rows.

More particularly, utilizing the extracted 3-dimensional crop canopy contour map 62, the processing device 52 can identify peaks in the 3-dimensional crop canopy contour data indicative of the location of each respective plant 30. Utilizing the identified peaks, the processing device 52 can calculate the overall height, with respect to the ground surface 26, of each plant 30 and/or various crown components of each plant 30 in the selected rows. Additionally, utilizing the extracted 3-dimensional crop canopy contour map 62, the processing device 52 can calculate the plant density data for each of the selected rows of plants, i.e., the number of viable plants in each respective selected row of plants. Furthermore, utilizing the extracted 3-dimensional crop canopy contour map 62, the processing device 52 can calculate the canopy volume data for each of the selected rows of plants, i.e., the cumulative volume of the crowns of the plants 30 that comprise each respective row of plants 30. Still further, utilizing a plurality of the extracted 3-dimensional crop canopy contour map 62 acquisitions generated at various times throughout the growth of the plants 30, the growth of the plants 30 in each of the selected rows and calculate corresponding growth curves for the plants 30 can be monitored.

Referring now to FIGS. 7A and 7B, in various embodiments, the plant structural characteristic data collection device 18 can comprise a 3-dimensional digital camera 59 fixedly mounted to the overhead beam 22. Generally, the 3-dimensional digital camera 59 includes a lens 60 operatively coupled to a signal processing unit 61 and is structured and operable to selectively receive, via the lens 60, data collection signals −A that are reflected from the plants 30 and the ground 26. More particularly, ambient light signals +A, e.g., sun light signals, are directed downward toward the plants 30 and the ground 26 within a field of view FOV of the lens 60. The ambient light signals +A are then reflected from the top surfaces of the various plant crown structures or the ground 26 within the FOV of the lens 60 back to the lens 60. The computer based processing device 52 then derives image data (described below) from the received reflected signals −A.

As described above, the processing device 52 performs the various data processing functions, the crop biometric and/or 3-dimensional mapping program/algorithm execution, and all other computing functions described herein. It is envisioned that the processing device 52 can comprise the 3-dimensional digital camera 59, a separate computing device communicatively connected to the 3-dimensional digital camera 59, or a combination thereof. As also described above, the separate computing device can be any suitable computer based device, system or network that is mounted locally on the mobile platform 14 or located remotely from the mobile platform 14.

Referring now to FIGS. 7A, 7B, and 7C, as the TMDCS 10 moves along the corridors 28 in the field 34, the 3-dimensional digital camera 59 captures the reflected signals −A within the field of view FOV of the lens 60 at a selected interval. For example, in various embodiments, the 3-dimensional digital camera 59 can capture a set of reflected signals −A within the field of view FOV of the lens 60 at a rate of once every two seconds. As each set of reflected signals −A are collected, the processing device 52 converts the respective captured reflected signals −A into scan data in the form of a respective 3-dimensional reflected image IR of the top surfaces of the various plant crown structures or the ground 26 within the field of view FOV of the lens 60. FIG. 7C illustrates four sets of captured reflected signals −A that have been converted into scan data in the form respective reflected 3-dimensional images IR1, IR2, IR3 and IR4. As shown in FIG. 7C, in various embodiments, the field of view FOV for the various sets of captured reflected signals −A can overlap such that the respective 3-dimensional reflected images IR1, IR2, IR3 and IR4 include overlapping data.

Each 3-dimensional reflected image IR is representative of a respective 3-dimensional field elevation profile of the scanned plants 30 and the surface of the ground 26 within the field of view FOV of the lens 60 at the time the 3-dimensional digital camera 59 captures each respective set of reflected signals +A. The processing device 52 then aggregates, adds, or combines, all of the 3-dimensional reflected images IR, to generate a high spatial resolution 3-dimensional field contour map 64 that is illustrative of an aggregate 3-dimensional top-view contour of the scanned plants 30 and the ground surface that can be displayed on a display device (e.g., display 78 described below) of the processing device 52. From the high spatial resolution 3-dimensional field contour map 64, the processing device 52 can then extract biometric information relating to the plants 30 in each of one or more selected rows of the scanned rows of plants 30, e.g., plant height data, plant density data, canopy volume data, plant growth rate data, etc.

As described above, in the various embodiments, wherein each row of plants 30 comprises plants of the same selected genotype, and the plants 30 in at least one of the rows are of a different genotype than the plants 30 in at least one other row of plants 30 in the field, the extracted biometric information can be utilized to determine which genotype of plants have one or more particular desired traits.

FIG. 8 provides a flow chart 300 illustrating a method of generating the crop biometric information in field conditions using the TMDCS 10, in accordance with the various embodiments of the present disclosure wherein the plant structural characteristic data collection device 18 comprises the 3-dimensional digital camera 59. First, the processing device 52 and the 3-dimensional digital camera 59 are initialized or activated to enable the capture of the various sets of reflected signals −A within the field of view FOV of the lens 60 at the selected interval, as described above and indicated at 302. Next, the 3-dimensional digital camera 59 and the processing device 52 begin to capture sets of reflected signals −A within the field of view FOV of the lens 60 at the selected interval as the mobile platform 14 moves through the corridors 28 and longitudinally along the rows of plants 30, as indicated at 304 and 306.

Subsequently, the processing device 52 and/or the 3-dimensional digital camera 59 converts each captured set of reflected signals −A into a respective 3-dimensional reflected image IR, as indicated at 308. Utilizing the plurality of 3-dimensional reflected images IR, the processing device 52 generates the 3-dimensional field contour map 64 illustrating the aggregate 3-dimensional top-view contour of the scanned plants 30 in the field 34, as indicated at 310. Once the TMDCS 10 has traversed the entire field 34, and the 3-dimensional field contour map 64 has been generated for the entire field 34, the processing device 52 can extract plant biometric information and/or data from the 3-dimensional field contour map 64, as indicated at 312.

More particularly, the processing device 52 aggregates, adds or combines, all the 3-dimensional reflected images IR to generate the aggregated 3-dimensional field contour map 64. In various embodiments, the various sets of reflected signals −A are captured and converted into the 3-dimensional reflected images IR, and the 3-dimensional reflected images IR are converted into the 3-dimensional field contour map 64, in real time, as the TMDCS 10 travels through the field 34.

Referring again to FIG. 6, as described above, in various embodiments, to extract the biometric information and/or data, the processing device 52 extracts from the 3-dimensional field contour map, e.g., 3-dimensional field contour map 58 or 64, a 3-dimensional crop canopy contour data map 62. The 3-dimensional crop canopy contour data map 62 is illustrative of the 3-dimensional top-view contour of only the plants 30 in the field 34, absent the background of the ground surface 26, particularly, the 3-dimensional top-view contour of one or more selected rows of plants 30, absent the background of the ground surface 26. Utilizing the extracted 3-dimensional crop canopy contour map 62, the processing device 52 can calculate various biometric data relating to the individual plants 30, the individual rows of plants 30 or the crop of plants consisting of the selected rows. For example, utilizing the extracted 3-dimensional crop canopy contour map 62, the processing device 52 can identify the location of each plant 30 in one or more selected rows within the scanned field 34 and determine various spatial dimensions of the crown for each respective plant 30 and the crop canopy of the selected rows.

More particularly, utilizing the extracted 3-dimensional crop canopy contour map 62, the processing device 52 can identify peaks in the 3-dimensional crop canopy contour data indicative of the location of each respective plant 30. Utilizing the identified peaks, the processing device 52 can calculate the overall height, with respect to the ground surface 26, of each plant 30 and/or various crown components of each plant 30 in the selected rows. Additionally, utilizing the extracted 3-dimensional crop canopy contour map 62, the processing device 52 can calculate the plant density data for each of the selected rows of plants, i.e., the number of viable plants in each respective selected row of plants. Furthermore, utilizing the extracted 3-dimensional crop canopy contour map 62, the processing device 52 can calculate the canopy volume data for each of the selected rows of plants, i.e., the cumulative volume of the crowns of the plants 30 that comprise each respective row of plants 30. Still further, utilizing a plurality of the extracted 3-dimensional crop canopy contour map 62 acquisitions generated at various times throughout the growth of the plants 30, the growth of the plants 30 in each of the selected rows and calculate corresponding growth curves for the plants 30 can be monitored.

Referring now to FIG. 9, as described above the processing device 52 can be the data collection device 18 (e.g., any data collection device 18 described herein), a separate computing device communicatively connected to the data collection device 18, or a combination thereof. In various embodiments, the processing device 52 can include at least one processor 70 suitable to execute all functions of processing device 52 to automatically, or robotically, control the operation of the TMDCS 10, as described herein. The processing device 52 additionally includes at least one electronic storage device 74 that comprises a computer readable medium, such as a hard drive or any other electronic data storage device for storing such things as software packages or programs, algorithms and digital information, data, look-up tables, spreadsheets and databases. Furthermore, in various implementations the processing device 52 can include a display 78 for displaying such things as information, data and/or graphical representations, and at least one user interface device 82, such as a keyboard, mouse, stylus, and/or an interactive touch-screen on the display 78. In various embodiments the processing device 52 can further include a removable media reader 86 for reading information and data from and/or writing information and data to removable electronic storage media such as floppy disks, compact disks, DVD disks, zip disks, flash drives or any other computer readable removable and portable electronic storage media. In various embodiments the removable media reader 86 can be an I/O port of the processing device 52 utilized to read external or peripheral memory devices such as flash drives or external hard drives.

In various embodiments, the processing device 52 can be communicatively connectable to a remote server network 90, e.g., a local area network (LAN) or wide area network (WAN), via a wired or wireless link. Accordingly, the processing device 52 can communicate with the remote server network 90 to upload and/or download data, information, algorithms, software programs, and/or receive operational commands. Additionally, in various embodiments, the processing device 52 can be structured and operable to access the Internet to upload and/or download data, information, algorithms, software programs, etc., to and from Internet sites and network servers.

In various embodiments, the processing device 52 can include one or more system control algorithms, or programs 94, stored on the storage device 74 and executed by the processor 70. For example, crop biometric and/or 3-dimensional mapping program/algorithms. The one or more system control algorithms generate the high spatial resolution 3-dimensional field contour map 58/64, as described above. Execution of the one or more system control algorithms then extract the canopy contour data from the high spatial resolution 3-dimensional field contour map 58/64 and generate the canopy contour data map 62 of one or more selected rows of plants 30, as described above.

As described herein, the processing device 52 generates the 3-dimensional field contour map 58/64 with high spatial resolution. That is, the 3-dimensional field contour map 58/64 generated by the processing device 52 provides a 3-dimensional top-view data image of the actual location of each plant 30 in each row, and the actual size, shape (e.g., the non-symmetrical shape), density and volume of the individual plant crowns and the overall plant canopy of the plants in each of the selected rows. Additionally, the 3-dimensional field contour map 58/64 generated by the processing device provides a 3-dimensional data image of the actual vertical height differences for the various crown components for each plant 30. In various embodiments, the processing device 52, as described herein, is capable of generating the 3-dimensional field contour map 58/64 and calculating the various biometric data, i.e., the various plant measurements, with an accuracy of approximately plus or minus one millimeter.

The extracted biometric data can be used for crop analytics and breeding, for example, either alone or in combination with other analysis as part of an automated program for the phenotypic identification and selection of plants having one or more desired traits. In particular, the extracted biometric data can be analyzed to select different genotypes that exhibit desired traits, such as higher yield and/or higher crop density, as part of a plant breeding program.

In various embodiments, the TMDCS 10 can include a global position sensor (GPS) device 66 (shown in FIG. 1A) operable to track the location of each of a plurality of fields 34 for which biometric data is derived using the TMDCS 10, as described above. Additionally, the TMDCS 10 is structured to be operable in all weather conditions due to the data collection device 18 being positioned in close proximity to the plants 30, as described above. Moreover, in the various embodiments wherein the plant structural characteristic data collection device 18 comprises the 3-dimensional digital camera 59, the GPS sensor can be integrated with, or operatively connected to, the 3-dimensional digital camera 59 such that operation of the 3-dimensional digital camera 59 at the selected intervals, as described above, can be controlled via the GPS sensor. In such embodiments, the selected intervals can be a specified distance of travel of the TMDCS 10 along the respective plant corridors 28. Hence, the GPS device 66 can monitor the travel of the TMDCS 10 along the respective plant corridors 28 and trigger the collection of the various sets of reflected signals -A at the selected intervals, e.g., every 5 feet of travel along the plant corridors 28.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A method of generating crop biometric information in field conditions for use in crop analytics and breeding, said method comprising:
    providing a test plot of plants comprising a plurality of rows of plants that have been planted such that each row of plants comprises at least one specific selected genotype of plants and at least one of the rows of plants comprises plants of a selected genotype that is different than the selected genotype of the plants in at least one of the other rows;
    scanning top surfaces of various plant crown structures of a plurality of the plants in one or more of the rows of plants to collect scan data of the crown structures;
    converting the scan data into a high spatial resolution 3-dimensional field contour map;
    extracting, from the high spatial resolution 3-dimensional field contour map, biometric information relating to the plants in each of the one or more rows of the scanned plants;
    utilizing the extracted biometric information to determine information regarding at least one selected trait for each of the plants in the one or more rows of scanned plants; and
    utilizing the determined trait information to identify one or more plants in the test plot exhibiting the at least one selected trait, thereby identifying which of the specific selected genotypes of plants exhibit the at least one selected trait.

2. The method of claim 1, wherein extracting biometric information comprises extracting plant height data relating to each of the plants in each of the one or more selected rows of plants from the high spatial resolution 3-dimensional field contour map.

3. The method of claim 1, wherein extracting biometric information comprises extracting plant density data relating to each of the one or more selected rows of plants from the high spatial resolution 3-dimensional field contour map.

4. The method of claim 1, wherein extracting biometric information comprises extracting canopy volume data relating to the plants in each of the one or more selected rows of plants from the high spatial resolution 3-dimensional field contour map.

5. The method of claim 1, wherein scanning the top surfaces of the various plant crown structures comprises:
    oscillating an emitter/receiver head of a data collection device of a terrestrial mobile data collection system along a linear range of motion that is substantially orthogonal to the rows of plants as the data collection device is moved along the rows of plants, via the terrestrial mobile data collection system, wherein each oscillation includes a forward sweep of the emitter/receiver head along the linear range of motion and a backward sweep of the emitter/receiver head along the linear range of motion, the data collection device mounted to the terrestrial mobile data collection device and positioned above the plants;
    continuously emitting data collection signals from an emitter of the emitter/receiver head as the emitter/receiver head oscillates back and forth along the range of motion and the data collection device is moved along the rows of plants;
    receiving, at a receiver of the emitter/receiver head, the emitted data collection signals reflected from the top surfaces of the various plant crown structures or the ground from which the plants are growing; and
    deriving the scan data from the received reflected data collection signals, for each forward and backward sweep as the data collection scanning device is moved along the rows of plants.

6. The method of claim 5, wherein converting the scan data into a high spatial resolution 3-dimensional field contour map comprises:
    converting the scan data derived from the received reflected data collection signals for each forward and backward sweep into a plurality of 2-dimensional data slices, via the processing device, each slice representative of a respective 2-dimensional field elevation profile of the scanned plants and a surface of the ground from which the plants are growing; and
    generating the high spatial resolution 3-dimensional field contour map utilizing the plurality of 2-dimensional data slices.

7. The method of claim 1, wherein scanning the top surfaces of the various plant crown structures comprises capturing, via a 3-dimensional digital camera, a plurality of sets of light signals reflected from the top surfaces of the various plant crown structures or the ground within a field of view of a lens of the 3-dimensional digital camera, the sets of light signals captured at a selected interval as the 3-dimensional digital camera is moved along the rows of plants.

8. The method of claim 7, wherein converting the scan data into a high spatial resolution 3-dimensional field contour map comprises
    deriving the scan data from the captured reflected light signals, in the form of a plurality of 3-dimensional reflected images of the top surfaces of the various plant crown structures or the ground within the field of view of the lens of the 3-dimensional digital camera; and
    generating the high spatial resolution 3-dimensional field contour map utilizing the plurality of 2-dimensional data slices.

9. A method of generating crop biometric information in field conditions for use in crop analytics and breeding using a terrestrial mobile data collection system, said method comprising:
    positioning a data collection device of the terrestrial mobile data collection system at a height that is greater than a height of all plants within a test plot comprising a plurality of rows of plants that have been planted such that each row of plants comprises at least one specific selected genotype of plants and at least one of the rows of plants comprises plants of a selected genotype that is different than the genotype of the plants in at least one of the other rows;
    moving the data collection device along the rows of plants in the test plot, via a mobile platform of the terrestrial mobile data collection system, with the data collection device remaining above the plants;
    scanning top surfaces of various plant crown structures of the plants in one or more of the rows and a surface of the ground from which the respective plants are growing, via the data collection device, to collect scan data of the crown structures as the data collection device is moved along the rows of plants, the crown structures of each plant comprising a canopy of each respective plant;

converting the scan data into a high spatial resolution 3-dimensional field contour map that illustrates an aggregate 3-dimensional field contour of the scanned plants and the ground surface, via a processing device of the terrestrial mobile data collection system;

extracting, from the high spatial resolution 3-dimensional field contour map, biometric information relating to the plants in each of the one or more rows of the scanned plants;

utilizing the extracted biometric information to determine information regarding at least one selected trait for each of the plants in the one or more rows of scanned plants; and utilizing the determined trait information to identify one or plants in the test plot exhibiting the at least one selected trait, thereby identifying which of the specific selected genotypes of plants exhibit the at least one selected trait.

10. The method of claim 9, wherein extracting biometric information comprises extracting plant height data relating to each of the plants in each of the one or more selected rows of plants from the high spatial resolution 3-dimensional field contour map.

11. The method of claim 9, wherein extracting biometric information comprises extracting plant density data relating to each of the one or more selected rows or plants from the high spatial resolution 3-dimensional field contour map.

12. The method of claim 9, wherein extracting biometric information comprises extracting canopy volume data relating to the plants in each of the one or more selected rows of plants from the high spatial resolution 3-dimensional field contour map.

13. The method of claim 9, wherein scanning the top surfaces of the various plant crown structures comprises:
oscillating an emitter/receiver head of the data collection device along a linear range of motion that is substantially orthogonal to the rows of plants as the data collection device is moved along the rows of plants, wherein each oscillation includes a forward sweep of the emitter/receiver head along the linear range of motion and a backward sweep of the emitter/receiver head along the linear range of motion;
continuously emitting data collection signals from an emitter of the emitter/receiver head as the emitter/receiver head oscillates back and forth along the range of motion and the data collection device is moved along the rows of plants;
receiving, at a receiver of the emitter/receiver head, the emitted data collection signals reflected from the top surfaces of the various plant crown structures or the ground from which the plants are growing; and
deriving the scan data from the received reflected data collection signals, for each forward and backward sweep as the data collection scanning device is moved along the rows of plants.

14. The method of claim 13, wherein the data collection device comprises one of a laser scanning device, an electromagnetic scanning device and a sonic scanning device, and wherein continuously emitting data collection signals comprise continuously emitting a respective one of laser signals, electromagnetic signals and sonic signals.

15. The method of claim 13, wherein converting the scan data into a high spatial resolution 3-dimensional field contour map comprises:

converting the scan data derived from the received reflected data collection signals for each forward and backward sweep into a plurality of 2-dimensional data slices, via the processing device, each slice representative of a respective 2-dimensional field elevation profile of the scanned plants and a surface of the ground from which the plants are growing; and generating the high spatial resolution 3-dimensional field contour map utilizing the plurality of 2-dimensional data slices.

16. The method of claim 15, wherein converting the scan data into a plurality of 2-dimensional data slices comprises:
calculating a data collection signal travel time from the emitter to the receiver of each data collection signal emitted during each respective forward and backward sweep;
converting the data collection signal travel time of each data collection signal emitted during each forward and backward sweep into data collection signal travel distance data representative of a distance from the data collection device each respective data collection signal traveled before being reflected from the top surfaces of the various plant crown structures or the ground; and
converting the data collection signal travel distance of each data collection signal emitted during each respective forward and backward sweep into a set of 2-dimensional coordinates located within a sweep plane generated by the data collection signals emitted during the respective forward or backward sweep, all the sets of 2-dimensional coordinates within each respective sweep plane comprising a corresponding one of the plurality of 2-dimensional data slices, and each of the 2-dimensional data slices providing a respective 2-dimensional field elevation profile.

17. The method of claim 9, wherein scanning the top surfaces of the various plant crown structures comprises capturing, via a 3-dimensional digital camera, a plurality of sets of light signals reflected from the top surfaces of the various plant crown structures or the ground within a field of view of a lens of the 3-dimensional digital camera, the sets of light signals captured at a selected interval as the 3-dimensional digital camera is moved along the rows of plants.

18. The method of claim 17, wherein converting the scan data into a high spatial resolution 3-dimensional field contour map comprises
deriving the scan data from the captured reflected light signals, in the form of a plurality of 3-dimensional reflected images of the top surfaces of the various plant crown structures or the ground within the field of view of the lens of the 3-dimensional digital camera; and
generating the high spatial resolution 3-dimensional field contour map utilizing the plurality of 2-dimensional data slices.

19. A method of generating crop biometric information in field conditions for use in crop analytics and breeding using a terrestrial mobile data collection system, said method comprising:
positioning a data collection device of the terrestrial mobile data collection system at a height that is greater than a height of all plants within a test plot comprising a plurality of rows of plants that have been planted such that each row or plants comprises at least one specific selected genotype of plants and at least one of the rows of plants comprises plants of a selected genotype that is different than the genotype of the plants in at least one of the other rows;

moving the data collection device along the rows of plants in the test plot, via a mobile platform of the terrestrial mobile data collection system, with the data collection device remaining above the plants;

scanning top surfaces of various plant crown structures of the plants in one or more of the rows and a surface of the ground from which the respective plants are growing, via the data collection device, to collect scan data of the crown structures as the data collection device is moved along the rows of plants, the crown structures of each plant comprising a canopy of each respective plant;

converting the scan data into a high spatial resolution 3-dimensional field contour map that illustrates an aggregate 3-dimensional field contour of the scanned plants and the ground surface, via a processing device of the terrestrial mobile data collection system;

extracting crop canopy contour data from the 3-dimensional field contour map of the scanned plants and the ground surface;

extracting, from the crop canopy contour data, biometric information relating to the plants in each of the one or more rows of the scanned plants;

utilizing the extracted biometric information to determine information regarding at least one selected trait for each of the plants in the one or more rows of scanned plants; and utilizing the determined trait information to identify one or more plants in the test plot exhibiting the at least one selected trait, thereby identifying which of the specific selected genotypes of plants exhibit the at least one selected trait.

20. The method of claim 19, wherein extracting biometric information comprises extracting at least one of:
   plant height data relating to each of the plants in each of the one or more selected rows of plants from the crop canopy contour data;
   plant density data relating to each of the one or more selected rows or plants from the crop canopy contour data; and
   canopy volume data relating to the plants in each of the one or more selected rows of plants from the crop canopy contour data.

21. The method of claim 19, wherein scanning the top surfaces of the various plant crown structures comprises:
   oscillating an emitter/receiver head of the data collection device along a linear range of motion that is substantially orthogonal to the rows of plants as the data collection device is moved along the rows of plants, wherein each oscillation includes a forward sweep of the emitter/receiver head along the linear range of motion and a backward sweep of the emitter/receiver head along the linear range of motion;
   continuously emitting data collection signals from an emitter of the emitter/receiver head as the emitter/receiver head oscillates back and forth along the range of motion and the data collection device is moved along the rows of plants;
   receiving, at a receiver of the emitter/receiver head, the emitted data collection signals reflected from the top surfaces of the various plant crown structures or the ground from which the plants are growing; and
   deriving the scan data from the received reflected data collection signals, for each forward and backward sweep as the data collection scanning device is moved along the rows of plants.

22. The method of claim 21, wherein converting the scan data into a high spatial resolution 3-dimensional field contour map comprises:
   converting the scan data derived from the received reflected data collection signals for each forward and backward sweep into a plurality of 2-dimensional data slices, via the processing device, each slice representative of a respective 2-dimensional field elevation profile of the scanned plants and a surface of the ground from which the plants are growing; and
   generating the high spatial resolution 3-dimensional field contour map utilizing the plurality of 2-dimensional data slices.

23. The method of claim 19, wherein scanning the top surfaces of the various plant crown structures comprises capturing, via a 3-dimensional digital camera, a plurality of sets of light signals reflected from the top surfaces of the various plant crown structures or the ground within a field of view of a lens of the 3-dimensional digital camera, the sets of light signals captured at a selected interval as the 3-dimensional digital camera is moved along the rows of plants.

24. The method of claim 23, wherein converting the scan data into a high spatial resolution 3-dimensional field contour map comprises
   deriving the scan data from the captured reflected light signals, in the form of a plurality of 3-dimensional reflected images of the top surfaces of the various plant crown structures or the ground within the field of view of the lens of the 3-dimensional digital camera; and
   generating the high spatial resolution 3-dimensional field contour map utilizing the plurality of 2-dimensional data slices.

25. A system for generating crop biometric information in field conditions for use in crop analytics and breeding, said system comprising:
   a data collection device positioned, via an overhead beam of the system, at a height that is greater than a height of all plants within a test plot comprising a plurality of rows of plants that have been planted such that each row of plants comprises at least one specific selected genotype of plants and at least one of the rows of plants comprises plants of a selected genotype that is different than the genotype of the plants in at least one of the other rows;
   a mobile platform structured and operable to move the data collection device along the rows of plants in the test plot with the data collection device remaining above the plants, the data collection device structured and operable to scan top surfaces of various plant crown structures of the plants in one or more of the rows to collect scan data of the crown structures, the crown structures of each plant comprising a canopy of each respective plant; and
   a processing device structured and operable to:
      convert the scan data into a high spatial resolution 3-dimensional contour field map that illustrates an aggregate 3-dimensional field contour of the scanned plants and the ground surface;
      extract crop canopy contour data from the 3-dimensional field contour map;
      utilize the extracted crop canopy contour data to generate biometric information relating to the plants in each of the one or more rows of the scanned plants;
      utilize the extracted biometric information to determine information regarding at least one selected trait for each of the plants in the one or more rows of scanned plants; and utilize the determined trait information to identify plants in the test plot exhibiting the at least one selected trait, thereby identifying which of the specific selected genotypes of plants exhibit the at least one selected trait.

26. The system of claim 25, wherein the data collection device comprises one of a laser scanning device, an electromagnetic scanning device and a sonic scanning.

27. The system of claim 25, wherein the data collection device comprises a 3-dimensional digital camera.

* * * * *